Patented June 4, 1946

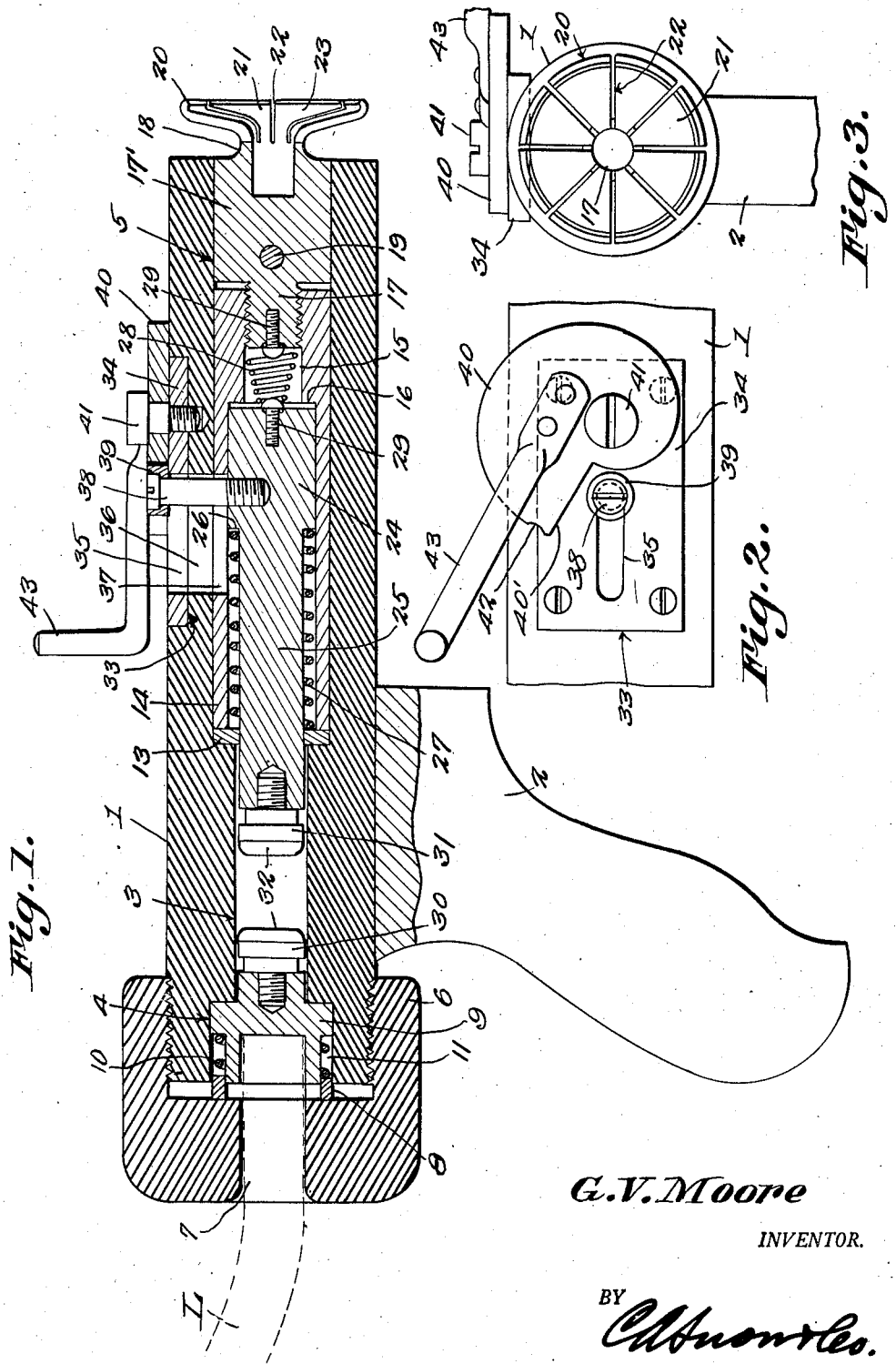

2,401,655

UNITED STATES PATENT OFFICE 2,401,655

PIN WELDING GUN

George Vinson Moore, Compton, Calif.

Application March 31, 1944, Serial No. 528,903

4 Claims. (Cl. 219—4)

This invention relates to a gun designed primarily for welding pins to plates of iron or steel after they have been inserted through one or more layers of fibrous insulating material to be joined to the sheets.

An object of the present invention is to provide a gun in which one end of a pin can be seated after which the pin is thrust through the insulating material of fiber glass, cork or the like, until the other end of the pin is brought into contact with the metal surface to which it is to be welded.

A further object is to provide the gun with a manually-controlled means by which a circuit can be established through the pin and the metal surface contacted thereby whereby an arc will be produced resulting in welding the pin to said surface.

A still further object is to provide a means for quickly breaking the circuit at the will of the operator upon completion of the welding operation.

Another object is to provide a gun of this type which is simple and compact in construction and can be manipulated readily.

With the foregoing and other objects in view which will appear as the description proceeds, the invention consists of certain novel details of construction and combinations of parts hereinafter more fully described and pointed out in the claims, it being understood that changes may be made in the construction and arrangement of parts without departing from the spirit of the invention as claimed.

In the accompanying drawing the preferred form of the invention has been shown.

In said drawing

Figure 1 is a central longitudinal section through the gun, the parts being shown in their normal positions.

Figure 2 is a plan view of the trigger and cooperating parts.

Figure 3 is an end elevation of the gun showing the chuck recess.

Referring to the figures by characters of reference, 1 designates the case of the gun, the same being formed of suitable insulating material such as fiber. A handle 2 is secured in any desired manner to the case at a point between its ends and formed axially within the case is a bore 3 having a short counterbore 4 at its back end while the other or forward end is provided with an elongated counterbore 5. A screw cap 6 of insulating material such as fiber is in detachable engagement with the back end of the case and has an opening 7 for the reception of the positive lead L of a welding circuit. This cap constitutes an abutment for a ring 8 which surrounds one end portion of a metal follower 9 into which the lead L is adapted to extend and to be fastened. The follower is held normally pressed against the inner end of the counterbore 4 by a spring 10 extending around a portion of the follower, said follower having an annular recess 11 for the reception of the ring 8 and also for the reception of the coiled spring 10 which exerts a thrust in one direction against the follower and in the opposite direction against the ring 8. Thus the follower is held yieldingly against the inner end of the counterbore 4 as will be apparent.

A washer 13 is seated on the inner end of the counterbore 5 and constitutes an abutment for a sleeve 14 of brass or other suitable metal for conducting electricity. The forward end of this sleeve has a bore 15 of reduced diameter providing an annular shoulder 16 at its inner end. The outer or forward end of this bore receives a screw-threaded stem 17 extending from the body 17' of a chuck 18. This body is fastened to the case 1 by a diametrical pin 19 extending therethrough.

The chuck has a flared head 20 providing a funnel-like recess 21 designed to receive one end of the pin to be welded in position. The walls of this head are preferably slit longitudinally as at 22 so as to provide segments 23 whereby the end of the pin can be snapped into frictional engagement with the head and thus held in proper relation thereto while being placed in position for welding.

A plunger 24 is fitted snugly within and is adapted to slide relative to the sleeve 14. This plunger has a stem 25 spaced from the sleeve 14 and adapted to work within the washer 13. An annular shoulder 26 extends around the base of the stem 25 and constitutes a seat for one end of a coiled spring 27. The other end of this spring bears against the washer 13. Thus the spring serves to hold the plunger normally pressed toward or against the shoulder 16 in sleeve 14.

A connecting spring 28 is interposed between the plunger 24 and the stem 17 and is attached to them by screws 29 or in any other suitable manner.

A contact button 30 is secured to the follower 9 and is supported within bore 3 and another contact button 31 is secured to the stem 25 and is supported within bore 3. These contact buttons are normally spaced apart but are adapted to be brought together when the plunger 24 is moved to one of its limits. The buttons can be suitably treated, as with silver solder, indicated at 32, to insure a tight electrical connection between the buttons when they are in circuit closing position.

A recess 33 is formed in the outer surface of the case 1 and has a plate 34 secured therein. A longitudinal slot 35 is formed in this plate and registers with similar slots 36 and 37 formed in case 1 and sleeve 14, respectively.

A cocking pin 38 is secured in plunger 24 and extends through and is slidable within the slots 35, 36 and 37. The outer end of this pin can be provided with a roller 39 and this roller is positioned where it contacts the edge of a cam 40 mounted for rotation on an attaching pin 41 seated in plate 34 and case 1. The volute cam 40 has a radial shoulder 40' connecting the innermost and the outermost portions of the periphery of the cam. In this periphery adjacent to the outermost portion thereof is a shallow recess 42 and a trigger 43 which can be in the form of an L-shaped arm, is secured to the cam and constitutes a means by which it can be rotated on the pin 41.

When the cam is in its normal position which is shown substantially in Fig. 2, the innermost portion of the periphery thereof is adjacent to but out of contact with roller 39. Thus the plunger 25 is held by its spring 27 in normal position with the two contact buttons spaced apart as shown in Fig. 1.

Assuming that the gun is connected to the positive lead of a welding circuit, the positive lead being joined to the follower 9 as before explained, the other or negative lead is joined to the plate to which the pins are to be welded. The circuit is normally broken, however, because the contacts 30 and 31 are normally spaced apart. A pin to be welded in place is positioned with one end gripped by the chuck 20. The gun is then used as a means for forcing the pin through the layer or layers of insulation to be held to the plate by pins. When the held pin is brought into contact with the plate to which it is to be welded after it has been forced through the insulating material, the operator thrusts the trigger 43 to one side so as to cause the cam 40 to rotate against roller 39 and force the cocking pin 38 longitudinally of the slots. This movement will be sufficient to bring contact button 31 against contact button 30. Instantly a circuit will be completed through the gun and through the leads and pin and plate, with the result that an arc will be set up between the pin and plate and the welding of these parts will be effected quickly. Immediately thereafter the trigger is pushed a sufficient distance to cause the roller 39, which had been seated in shallow recess 42, to drop past the radial shoulder 40' so that the parts will be released to instantly break the circuit. The gun can then be removed from the welded pin, another pin placed therein, and the foregoing operation repeated.

By providing the spring-pressed follower 9, the blow of the contact 31 against the contact 30 is cushioned, as will be obvious. The spring 28 merely elongates and contracts during the operation of the plunger so as to insure an electrical connection at all times between the plunger and the chuck.

What is claimed is:

1. A pin welding gun including a case, a cushioned contact supported in one end of the case for engagement with the positive lead of a welding circuit, a pin-engaging chuck supported in the other end of the case, a plunger in the case electrically connected to the chuck, a contact movable with the plunger into and out of engagement with the first named contact, and means on the case and rotatable in one direction for successively shifting the plunger in one direction to bring the contacts together and complete a circuit and then releasing the plunger to break the circuit.

2. A pin welding gun including a case, a cushioned contact supported in one end of the case for engagement with the positive lead of a welding circuit, a pin-engaging chuck supported in the other end of the case, a plunger in the case electrically connected to the chuck, a contact movable with the plunger into and out of engagement with the first named contact, and means on the case and rotatable in one direction for successively shifting the plunger in one direction to bring the contacts together and complete a circuit and then releasing the plunger to break the circuit, said means including a cam, a manually operated trigger thereon, means for transmitting thrust in one direction from the cam to the plunger, and yielding means for returning the plunger to its initial position when released from the cam.

3. A pin welding gun including a case, a cushioned contact movably supported in one end of the case for engagement by one lead of a welding circuit, a pin-engaging and holding chuck carried by one end of the case, a sleeve in the case joined to the chuck, means for anchoring the sleeve and chuck in the case, a spring-restrained plunger mounted for sliding movement in the case, an elastic electrical connection between the plunger and the chuck, a contact carried by the plunger and supported in the case in position for movement against and away from the first named contact, a manually operated cam on the case, and means operated by the movement of the cam in one direction for successively moving the plunger in one direction to bring the contacts together and release the plunger for return movement by its restraining spring.

4. A pin welding gun including a case, a contact in one end portion thereof for engagement by one lead of a welding circuit, a pin-holding chuck carried by the other end of the case, a spring-restrained contact supported in the case and electrically connected to the chuck, a cam on the case, and means under the control of the operator for moving the cam in one direction to successively move the contacts together and release the contacts for separation.

GEORGE VINSON MOORE.